INVENTORS.
NOEL B. BRAYMER
EVERETT W. MOLLOY
BY THEIR ATTORNEYS.
HARRIS, KIECH, FOSTER & HARRIS

SELF-ZEROING AMPLIFIER

Filed Jan. 22, 1957 2 Sheets-Sheet 2

INVENTORS.
NOEL B. BRAYMER
EVERETT W. MOLLOY
BY THEIR ATTORNEYS.
HARRIS, KIECH, FOSTER & HARRIS

United States Patent Office 2,970,266

Patented Jan. 31, 1961

2,970,266

SELF-ZEROING AMPLIFIER

Everett W. Molloy, Fullerton, and Noel B. Braymer, Garden Grove, Calif., assignors to Beckman Instruments, Inc., Fullerton, Calif., a corporation of California Filed Jan. 22, 1957, Ser. No. 635,320

3 Claims. (Cl. 324—123)

This invention relates to amplifiers which substantially eliminate drift due to internal effects. Such amplifiers, which minimize internal effects such as component variation, aging and power supply variations, are commonly referred to as "drift-free" or "self-compensating" or "self-zeroing."

Direct coupled amplifiers may be used to detect and measure electrical signals having D.C. or low frequency components. They are simple and inexpensive, introduce a minimum of extraneous signals and may be designed to have very high input impedances. They have the deficiency however that D.C. or very low frequency potentials, caused by the above-mentioned internal effects, are introduced internally, and may be indistinguishable from the external signal which it is desired to amplify. It is an object of this invention to provide amplifiers of the self-zeroing type which substantially eliminate the effects of internal signals.

A basic problem inherent in the design of substantially drift-free compensated amplifiers is the maintenance of smooth and continuous output during the compensation cycle. In many applications of amplifiers, the measured phenomena must be monitored continuously. Previous methods of compensation or correction, when used in such applications, introduce voltage excursions in the output during the corrective phase which may be very large and disconcerting. The present invention contemplates minimization of the voltage excursions which appear at the output terminals during and subsequent to the automatic correction step.

An object of the invention is to provide means for isolating and automatically compensating for internally created signals. This may be accomplished by momentarily removing the external signal from the circuit and generating a correction signal representative of the internal error which is stored or memorized in a memory unit. During a subsequent measuring period, when the external signal is reapplied, this stored signal is used for correction. The correcting period can be very brief and the correction can be performed either at regular or random intervals, provided that it is made prior to the time of measurement.

It is another object of the invention to provide such an amplifier in which an output thereof is coupled to a memory unit in circuit with the input of the amplifier while the input is coupled to a reference point, thereby providing the drift cancellation or correction signal. A further object of the invention is to provide such an amplifier which may have two serially connected amplifying sections, with the gain of the second section preferably being greater than the gain of the first section, wherein the output of the first section represents the signal being amplified and the output of the second section is the source of the cancellation or correction signal used during the compensation cycle.

It is another object of the invention to provide a substantially drift-free amplifier suitable for use in amplifying and indicating the output of pH measuring electrodes.

The invention also comprises novel details of construction and novel combinations and arrangements of parts, which will more fully appear in the course of the following description. The drawings merely show and the description merely describes preferred embodiments of the present invention, which are given by the way of illustration or example.

An amplifier having a low frequency sampling and balancing process has been devised to achieve the objects of the invention. The amplifier has two states of operation which will be referred to as the "operate" or "measuring" phase and the "compensate" or "correction" phase, the amplifier preferably being periodically switched from one phase to the other with the duration of the correction phase being much shorter than that of the measuring phase. During the correction phase, information which is a function of the output of the amplifier due to internal causes is stored in a memory unit, the input section of the amplifier being coupled to a reference point and the indicated output being maintained substantially constant. During the measuring phase, a signal from the memory unit is combined with the signal to be amplified so as to compensate for the undesired signals, i.e., drift, etc., introduced by the amplifier itself. By this arrangement, the zero signal output of the amplifier is maintained constant at the beginning of each measuring phase.

Figures 1, 2, 3, 4:
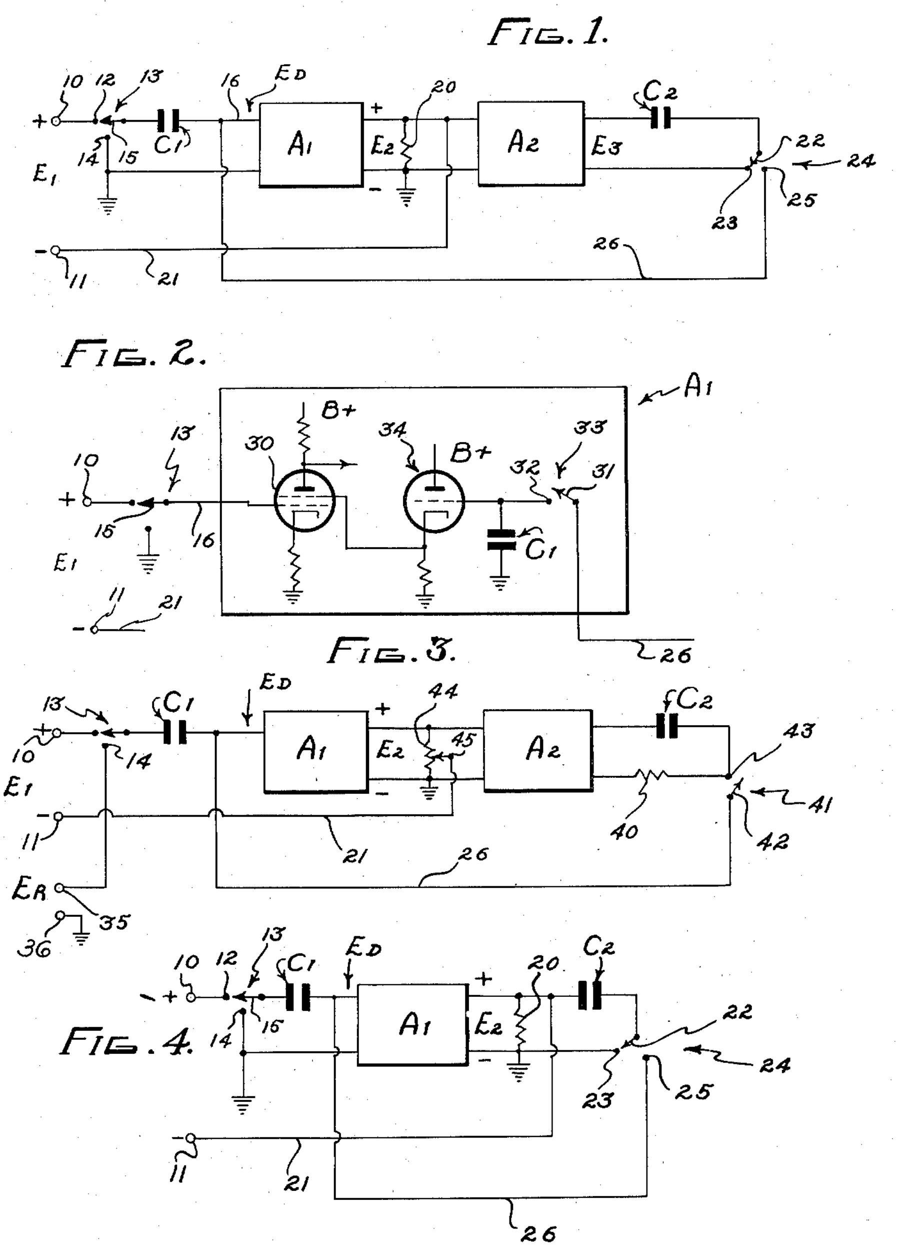
Fig. 1 is a block diagram showing a preferred embodiment of the amplifier of the invention.
Fig. 2 is a circuit diagram showing an alternative embodiment of a portion of the amplifier of Fig. 1.
Fig. 3 is a block diagram showing an alternative embodiment of the amplifier of Fig. 1.
Fig. 4 is a block diagram showing a modified form of the amplifier of Fig. 1.

A preferred embodiment of the amplifier of the invention is shown in block diagram form in Fig. 1. The input signal E1 which is to be amplified is connected to input terminals 10 and 11. A fixed contact 12 of a set of contacts 13 of a suitable relay or switch is connected to the terminal 10 and another fixed contact 14 of the set of contacts 13 is connected to circuit ground. A moving contact 15, which may be engaged with either of the fixed contacts 12 or 14, is connected to one terminal of a capacitor C1 which serves as the memory unit. The other terminal of the capacitor C1 is connected to an amplifier A1 by an amplifier input lead 16. The amplifier of this embodiment is provided with two amplifying sections A1 and A2 which will be referred to hereinafter as the "feedback amplifier" A1 and the "corrector amplifier" A2.

The output E2 of the feedback amplifier A1 is developed across a load resistor 20 and may be measured and/or recorded by any conventional voltage or current measuring device, the output E2 being the output of the over-all circuit which it is desired to obtain through the use of the amplifier of the invention when the input E1 is coupled thereto. The output of the feedback amplifier A1 is connected directly to the input terminal 11 by a conductor 21, thereby providing effectively 100% feedback across amplifier A1.

The output of the feedback amplifier A1 is coupled to the input of the corrector amplifier A2, which may be a conventional voltage amplifier with a gain preferably several times that of the amplifier A1. A corrector capacitor C2 is connected in the output E3 of the corrector amplifier A2 in series with a moving contact 22 and a fixed contact 23 of a set of contacts 24 which is similar to the set of contacts 13. Another fixed contact 25 of the set of contacts 24 is connected by a conductor 26 to a terminal of the memory capacitor C1 which is connected to the amplifier input lead 16.

In operating the amplifier of the invention, the signal to be measured is connected to the input terminals 10, 11 and the sets of contacts 13 and 24 are continuously switched from the positions shown in Fig. 1, which is the measuring phase, to the opposite positions, which is the correction phase, and return. Such switching is preferably done periodically and automatically such as by a motor driven switch or an oscillator circuit. The dwell time on the correction phase need only be a very small portion of the total switching cycle and it has been found that, for example, a switching cycle in the order of one cycle per second is suitable for the pH meter illustrated in this application.

The primary purpose of the amplifier of the invention is to eliminate or substantially reduce variations in the output E2 which do not correspond to variations in the input E1, such variations being caused by disturbances in the feedback amplifier A1 and being represented in Fig. 1 by the signal $E_D$ added at the amplifier input lead 16. When the amplifier is operating in the correction phase, i.e., with the sets of contacts 13, 24 in the reverse of the positions shown in Fig. 1, the input to the feedback amplifier A1 is connected to circuit ground through the capacitor C1 and the memory capacitor is charged from the corrector capacitor C2 through the conductor 26. During this phase of operation, the output E2 changes by an amount approximately equal to the drift signal $E_D$ divided by the gain of the corrector amplifier A2. Since the gain of this amplifier is ordinarily quite high, this change in output will be very small and in most applications of the invention will be substantially zero.

When the circuit is switched to the measuring phase, as shown in Fig. 1, the voltage due to the charge on the memory capacitor C1 is combined with the input signal E1 to oppose and cancel the effect of the drift signal $E_D$ at the input to the feedback amplifier A1. Hence during this phase of operation, the output E2 is substantially equal to the input E1, with the accuracy of this relation being a function of the gains of the amplifiers A1 and A2. Also, the corrector capacitor C2 is charged to the output potential E3 of the corrector amplifier A2. Of course, the 1:1 relation applies only when there is substantially 100% feedback as shown in Fig. 1, other amounts of feedback producing different relations between the output and input signals. Thus it is seen that with the circuit of the invention the relation of the output E2 to the input E1 is maintained constant over long periods of time without requiring any external checking or adjustments.

By analysis of the circuit, it can be shown that during the correction phase, the output E2 of the feedback amplifier A1 will vary from its value at the end of the measuring phase only by an amount substantially equal to magnitude of the signal $E_D$ divided by the gain of the corrector amplifier A2. This variation will be quite small since the gain is made relatively large. During the measuring phase, the circuit of the invention provides a reduction in drift substantially equal to the product of the gains of the two amplifiers, and the effective loop gain with respect to the accuracy of the measuring circuit is the product of the gain of the corrector amplifier and the square of the gain of the feedback amplifier.

For example, consider a circuit with an overall gain of 1000, with the feedback amplifier having a gain of 10 and the corrector amplifier a gain of 100. The change in output during the correction phase will be $E_D/100$ and thus negligible, while the accuracy during the measuring phase will be equal to that of a simple amplifier of gain 10,000.

Of course, many variations in details of circuitry may be made without affecting the design and mode of operation of the amplifier. Several such variations are described as the alternative embodiments herein. For example, the correction signal from the memory storage unit need not be injected at the input lead to the feedback amplifier but may be injected at any other suitable point therein. In Fig. 2 the feedback amplifier input 16 is directly connected to the moving contact 15 of the set of contacts 13 and to one grid of an amplifier tube 30. The memory capacitor C1 is charged from the corrector capacitor C2 through the conductor 26, a moving contact 31 and a fixed contact 32 of a set of contacts 33, the set of contacts 33 being open as shown in Fig. 2 during the measuring phase and closed during the correction phase. The signal from the memory capacitor is injected into the amplifier A1 at a second grid of the amplifier tube 30 via a cathode follower 34. In all other respects, the circuit of Fig. 2 may be identical with that of Fig. 1.

Several additional variations are shown in Fig. 3. The fixed contact 14 of the set of contacts 13 is connected to a reference terminal 35 rather than to circuit ground, as in Fig. 1. A reference voltage $E_R$ which may be fixed or varying slowly relative to the switching cycle of amplifier is connected to the terminals 35 and 36 and serves as the reference value to which the memory capacitor C1 is connected during the correction phase. When thus connected, the amplifier serves as a difference amplifier, the output E2 being a function of the difference between the reference signal $E_R$ and the input signal E1.

A feedback factor of less than 100% is achieved in the circuit of Fig. 3 by substituting a potentiometer 44 for the load resistor 20 and having the feedback conductor 21 connected to an arm 45 of the potentiometer rather than to the output of the feedback amplifier A1.

The feedback factor is controlled by the position of the arm 45 and may be reduced to zero by moving the arm to the bottom of the potentiometer, i.e., connecting the input to ground. In some applications of the invention, the self-zeroing amplifier may be operated without continuous feedback, i.e., with a zero feedback factor. Of course, there is always feedback during the correction phase of the operating cycle.

The corrector capacitor C2 is coupled in series with a resistor 40 across the output of the corrector amplifier A2, thus permitting elimination of one fixed contact in a set of contacts 41 which connects the corrector capacitor C2 to the memory capacitor C1. The set of contacts 41 consists of a moving contact 42 connected to the conductor 26 and a fixed contact 43 connected to the junction point between the resistor 40 and the capacitor C2, the contacts being shown in the measuring phase in Fig. 3. The variations discussed above with respect to the circuit of Fig. 3 may be incorporated into the circuit of Fig. 1 either singly or in any desired combination without modifying the mode of operation of the amplifier of Fig. 1 as previously described. As a means of further reducing the excursion in the output signal during the correction phase, the output stage or stages of the amplifier A1 (or of a recorder connected to this amplifier) could be isolated or disconnected from the input or earlier stages thereof and maintained at a substantially constant level for the duration of the correction phase.

The basic requirement of a feedback circuit is that the input voltage and the feedback voltage be equal. Hence, when the input voltage and the feedback voltage are connected in series, as in the circuit of Fig. 1, they cancel and the potential at the summing node 10 is at ground. In such case the voltage across the load 20 is exactly opposite to that across terminals 10 and 11. This is achieved in the circuit of the invention as the result of several corrections in which the left-hand plate of capacitor C1 is momentarily grounded and the output of amplifier A2 is connected to the input of amplifier A1 through capacitor C2.

The amplifiers A1 and A2 when connected through C2 to the input of amplifier A1 act in such a manner as to oppose any change of the input to A1. If a change of potential should be applied at terminal 13 as switch arm 15 moves from 12 to ground (14), point 16 would tend to change in potential. Then the output of amplifier A2 will change by whatever amount is necessary to keep the potential at 16 from changing and that amount will depend upon the relative capacitances of C1 and C2.

It is apparent that some slight change of potential at 16 will occur in order to produce the change of potential at the output of A2 which slight change depends on the gain of A1×A2. Since point 16 remains essentially fixed in potential, nearly all of the step change at 13 is imposed upon C1. When point 13 is reconnected to point 10, point 16 will again tend to change due to the new potential which was just placed across C1.

Amplifier A1 will then act through point 11, E1 and C1 so as to oppose the new tendency of point 16 to change. Thus, point 10 will change to ground potential, achieving the desired purpose of the circuit. It should be noted that the drift potential which would have existed at 10 if 10 were the input of an ordinary D.C. amplifier is, in the circuit of Fig. 1, made to appear across C1.

A modification of the circuit of Fig. 1 is shown in Fig. 4, wherein the second amplifying section, previously referred to as the corrector amplifier A2, is omitted and the corrector capacitor C2 and set of contacts 24 are connected across the output of the amplifying section A1. The operation of this circuit is the same as that of the circuit of Fig. 1, however, variations produced in the indicated output during the correction phase will be greater than for the circuit of Fig. 1 under equivalent operation conditions. The circuit of Fig. 4 may be used in applications where the magnitude of the internal variation in the amplifier is small compared with the magnitude of the signal being measured.

Figure 5:
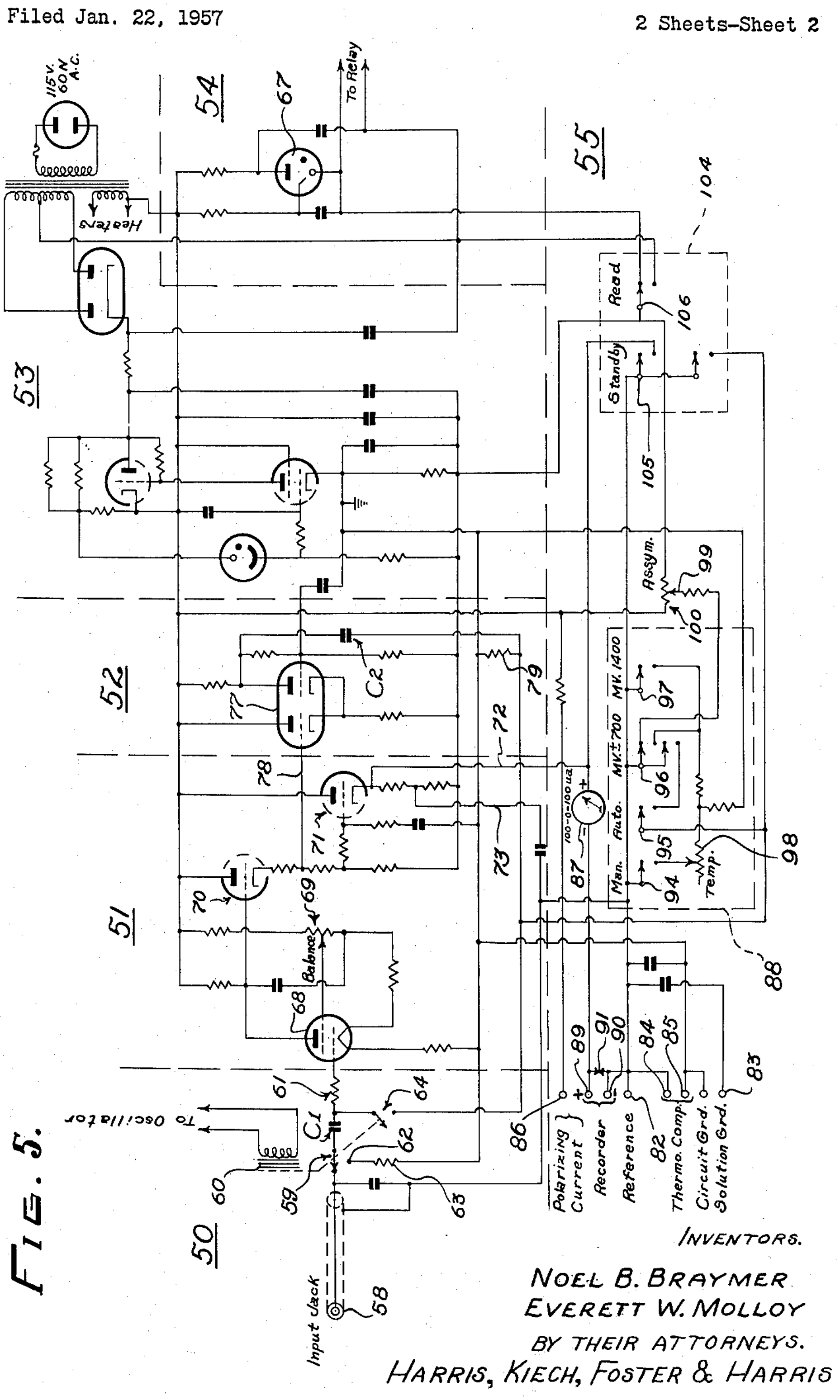
Fig. 5 is a wiring diagram showing an embodiment of the invention adapted for use with a pH meter.

The self-balancing amplifier circuit of the invention is especially suitable for use with pH measuring equipment having a glass electrode and a reference electrode for insertion into the solution for determining the pH thereof. A complete circuit diagram of such an amplifier is shown in Fig. 5 and may be divided into an input section 50, a first or feedback amplifying section 51, a second or corrector amplifying section 52, a power supply section 53, an oscillator section 54 and a control section 55. In the input section 50, an input signal is coupled to the feedback amplifier through an input jack 58, a set of contacts 59 of a relay 60, the memory capacitor C1 and a grid resistor 61. A fixed contact 62 of the set of contacts 59 is connected to circuit ground through a resistor 63, the contact 62 being the reference point to which the input of the feedback amplifier is connected during the correction phase. Another set of contacts 64 of the relay 60 provides for charging the memory capacitor C1 from the corrector capacitor C2 during the correction phase. When the resistor 63 is connected in series with the memory capacitor C1, the memory capacitor is charged to the average value of the output of the corrector amplifier during the correction phase, thus tending to eliminate the effects of high frequency noise from the drift compensation being achieved.

In Fig. 5 the relay 60 is shown in the measuring phase, the relay being connected and actuated by a low frequency oscillator in the oscillator section 54 which comprises a gas trigger tube 67 in a conventional circuit which provides a pulsed output for actuating the relay approximately once per second. The power supply section 53 comprises a conventional regulated power supply operated from a 115 volt, 60 cycle source and supplies power for the oscillator and the amplifiers of the circuit.

The first amplifier section 51 is the pH measuring amplifier corresponding to the amplifier A1 of Fig. 1. This amplifying section comprises an amplifier tube 68, ordinarily of the electrometer type, with an input balance control 69, a cathode follower 70 and another cathode follower 71, the output of the amplifying section appearing at the lead 72. The gain of the section is stabilized by negative voltage feedback provided at the lead 73. The balance control 69 varies the input bias condition and is used for initial circuit adjustment and when tubes are replaced.

The corrector amplifier 52 comprises a dual-element vacuum tube 77 operated as a two-stage amplifier with an input furnished from the cathode follower 70 through a lead 78, the output appearing across the capacitor C2 and a resistor 79.

In operating the amplifier circuit of Fig. 5 as a pH meter, the glass electrode is connected to the input jack 58, the reference electrode is connected to a reference terminal 82, and the solution being measured is connected directly to a solution ground terminal 83. The central conductor of the jack 58 corresponds to the terminal 10 of Fig. 1, and the reference terminal 82 corresponds to the terminal 11. When it is desired to compensate the amplifier for variations in solution temperature, a temperature sensitive resistor is immersed in the solution and connected across terminals 84 and 85. For certain types of measurement, it is desirable to create a current in the solution during the measurement and provision is made for this at terminal 86 to which a polarizing electrode may be connected.

The output of the pH measuring amplifier section 51 is coupled to ground through the lead 72, a current meter 87, and a control switch 88. If desired, an output recorder may be coupled in circuit between the meter and switch at terminals 89 and 90, the circuit being broken at point 91 when the recorder is plugged in.

The control switch 88 comprises four push button actuated switches 94, 95, 96 and 97 which are interlocked so that only one may be depressed at a time, all four push buttons being shown in the "up" position in Fig. 5. A variable resistor 98 is coupled between the meter 87 and the circuit ground when the manual temperature compensation push button 94 is depressed. This permits a manual adjustment of the indicated output of the pH meter. When automatic compensation for temperature variation in the solution is desired, the temperature sensitive resistor is connected to the terminals 84, 85 and the automatic push button 95 is depressed. The amplifier circuit of Fig. 5 may also be used to directly measure a voltage applied at the input jack 58, the push button 96 connecting the load circuit so that both positive and negative voltages may be measured, and the push button 97 connecting the load so that positive voltages only are measured. An adjustable bias voltage is provided at a moving arm 99 of a potentiometer 100 to permit adjustment to compensate for inherent bias potential of the particular electrode being used, this adjustment usually being referred to as the "asymmetry" adjustment. The bias voltage from the potentiometer 100 also permits change of the zero point when the instrument is operated as a voltmeter with push button 97 depressed.

A control switch 104 has push button actuated switches 105 and 106 which are arranged so that only one may be depressed at a time, both switches being shown in the "up" position in Fig. 5. When the stand-by push button 105 is depressed, the oscillator is blocked and the indicating circuitry is by-passed and, when the read push button 106 is depressed, the oscillator is operable to actuate the relay and the amplifier circuit is connected to operate in the same manner as previously described.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a self-zeroing amplifier circuit, the combination of: an input terminal; an input capacitor; relay means having at least two sets of switching contacts movable between operate and correct positions, one of said sets of contacts connecting said input capacitor to said input terminal when in said operate position and to a reference point when in said correct position; a first amplifying section including means coupling the output thereof to the input thereof; indicating means for determining the output of said first amplifying section; circuit means coupling said input capacitor to said first amplifying section in signal transmitting relationship; a second amplifying section including an output capacitor coupled in the output thereof; means coupling said first amplifying section to said second amplifying section in signal transmitting relationship; circuit means including another of said sets of contacts for coupling said output capacitor to said input capacitor charging said input capacitor from said output capacitor when said relay means is in said correct position; and means for periodically switching said relay means from said operate position to said correct position and return.

2. In an amplifier circuit for generating an output signal in response to an input signal, the combination of: first amplifier means having an input and an output; second amplifier means having an input and an output; first switch means for selectively coupling a transfer point to an input reference terminal and a reference point; a memory capacitor having one terminal connected to said transfer point and the other terminal connected to said first amplifier means input; feedback circuit means for connecting at least part of the output signal of said first amplifier means in series with the input signal in cancelling relation to generate an error signal at said input terminal for said first amplifier means input; means for coupling said first amplifier means output to said second amplifier means input; a corrector capacitor coupled to said second amplifier means output; second switch means for coupling said corrector capacitor to said first amplifier means input; and means for activating said switch means for simultaneously coupling said one terminal of said memory capacitor to the reference point and coupling said corrector capacitor to said first amplifier means input charging said memory capacitor from said second amplifier means output through said corrector capacitor and providing a correction signal to said first amplifier means input.

3. In an amplifier circuit for generating an output signal in response to an input signal, the combination of: amplifier means having an input and an output; a memory capacitor having first and second terminals, with said second terminal connected to said amplifier means input; first switch means for selectively coupling said first terminal of said memory capacitor to a reference point and to an input terminal; feedback circuit means for connecting at least part of the output signal in series with the input signal in cancelling relation to generate an error signal at said input terminal; a corrector capacitor coupled to said amplifier means output; second switch means for coupling said corrector capacitor to said amplifier means input; and means for activating said switch means for simultaneously switching said first terminal of said memory capacitor from said input terminal to the reference point and switching said corrector capacitor to said amplifier means input charging said memory capacitor from said amplifier means output through said corrector capacitor and providing a correction signal to said amplifier means input.

References Cited in the file of this patent

UNITED STATES PATENTS

| | | |
|---|---|---|
| 2,297,543 | Eberhardt et al. | Sept. 29, 1942 |
| 2,372,062 | Dorsman | Mar. 20, 1945 |
| 2,459,730 | Williams | Jan. 18, 1949 |
| 2,571,746 | Mouzon | Oct. 16, 1951 |
| 2,709,205 | Colls | May 24, 1955 |

FOREIGN PATENTS

| | | |
|---|---|---|
| 620,140 | Great Britain | Mar. 21, 1949 |

OTHER REFERENCES

Reich Theory and Application of Electron Tubes, McGraw-Hill, 1944, pages 157, 158.